United States Patent
Kumhyr

(10) Patent No.: US 7,289,608 B2
(45) Date of Patent: Oct. 30, 2007

(54) METHOD AND SYSTEM FOR VISUALLY REARRANGING TELEPHONE CALL TREES

(75) Inventor: David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 10/752,609

(22) Filed: Jan. 7, 2004

(65) Prior Publication Data
US 2005/0147215 A1 Jul. 7, 2005

(51) Int. Cl.
*H04M 11/06* (2006.01)
(52) U.S. Cl. .................................. 379/88.18; 455/445
(58) Field of Classification Search ............. 379/88.13, 379/142.07, 88.18; 455/445
See application file for complete search history.

(56) References Cited

U.S. PATENT DOCUMENTS

| | | | | |
|---|---|---|---|---|
| 5,608,788 A | * | 3/1997 | Demlow et al. | 379/142.07 |
| 5,737,393 A | * | 4/1998 | Wolf | 379/88.13 |
| 5,832,059 A | | 11/1998 | Aldred et al. | 379/34 |
| 5,905,959 A | * | 5/1999 | Foladare et al. | 455/445 |
| 5,912,952 A | | 6/1999 | Brendzel | 379/93.25 |
| 6,064,730 A | | 5/2000 | Ginsberg | 379/265 |
| 6,272,216 B1 | | 8/2001 | Vaios | 379/265 |
| 6,504,917 B1 | | 1/2003 | Flint et al. | 379/93.01 |
| 6,519,246 B1 | | 2/2003 | Strahs | 370/352 |
| 6,748,066 B1 | | 6/2004 | Espejo et al. | |
| 6,978,129 B1 | | 12/2005 | Peon et al. | |

OTHER PUBLICATIONS http://java.sun.com/products/jtapi-1.3/html/javax/telephony/, "Java Mobile Telephony Specification", pp. 1-2.
http://www.crmdownload.com/callcentersoftware/winivr-interactive-voice-response.htm, "CRMDownload.com", pp. 1-2.

* cited by examiner

*Primary Examiner*—Gerald Gauthier
(74) *Attorney, Agent, or Firm*—Duke W. Yee; Jeffrey S. LaBaw; Gerald H. Glanzman

(57) ABSTRACT

A method, system and computer instructions for users to visually rearrange telephone call trees are disclosed. A caller can connect to an automated telephone answering service, and download the service's call tree. The caller can view a display with the call tree, and modify or rearrange the order in which the menu options of the call tree are displayed. The user can then store the modified call tree for use in the future.

7 Claims, 3 Drawing Sheets

METHOD AND SYSTEM FOR VISUALLY REARRANGING TELEPHONE CALL TREES

BACKGROUND OF THE INVENTION

1. Technical Field

The present invention relates generally to telephony, and in particular, but not exclusively, to a method and system for visually rearranging call trees.

2. Description of Related Art

Automated telephone answering systems are typically software applications that answer and process incoming telephone calls. So-called "call path" or "call tree" systems are automated telephone answering systems used by businesses to reduce the costs of answering customers' calls. However, these cost reductions are usually offset by the inconveniences forced on the customers, who typically have to wade through a long, confusing and sometimes frustrating maze of options in menu form. These menus of options are commonly referred to as "call trees".

A significant drawback of existing call tree systems is that they typically require callers to make multiple attempts before they can traverse the menu options successfully. For example, in the health care field, a patient might submit a payment request to an insurance provider for services performed by a healthcare provider. If the healthcare provider fails to submit the appropriate paperwork to the insurance provider in order to support the alleged services performed, the insurance provider might reject the patient's submission. Typically, the patient's only recourse is to call the insurance provider. If the insurance provider's answering system uses a complicated and/or confusing call tree, having to navigate such a complicated or confusing call tree only exacerbates the patient's concern and frustration about the rejected payment request.

Another drawback of existing call tree systems is that significantly different call trees are typically used in similar technologies. For example, a call tree used for voice mail in a cellular telephone system can be significantly different than the call tree used for voice mail in the wire-line telephone system within the same region.

Therefore, it would be advantageous to have an improved method and system that allows a caller to interact with and modify a call tree, and thereby make it easier and quicker for the caller to navigate the call tree options successfully.

SUMMARY OF THE INVENTION

The present invention provides a method, system and computer instructions for users to visually rearrange telephone call trees. A caller can connect to an automated telephone answering service, and download the service's call tree. The caller can view a display with the call tree, and modify or rearrange the order in which the menu options of the call tree are displayed. The user can then store the modified call tree for use in the future.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
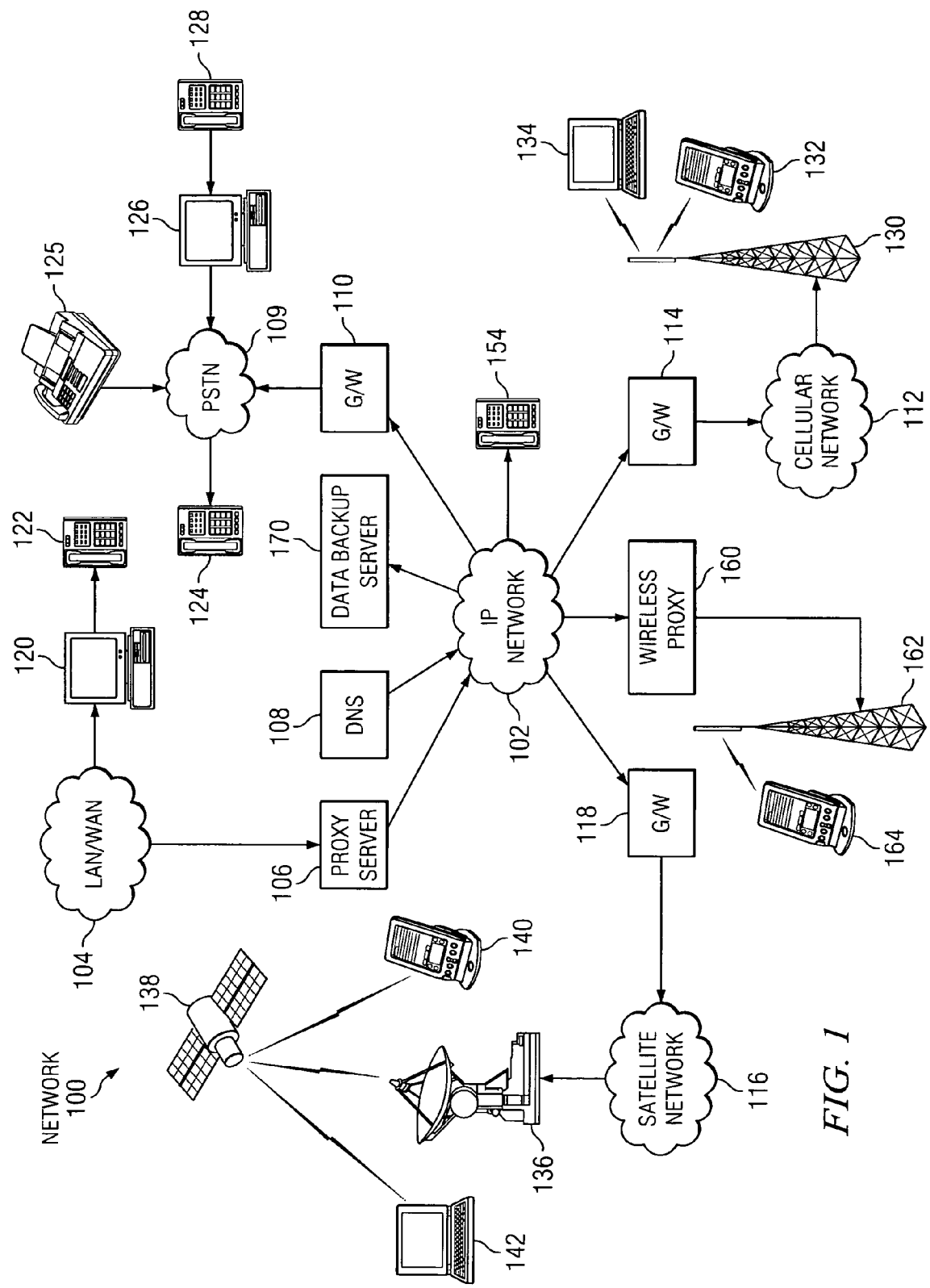
FIG. 1 is a system diagram illustrating a plurality of interconnected, heterogeneous networks in which the present invention may be implemented.

With reference now to the figures, and in particular with reference to FIG. 1, a system diagram illustrating a plurality of interconnected, heterogeneous networks in which the present invention may be implemented is depicted. As illustrated, exemplary system 100 includes Internet Protocol (IP) network 102, Local Area Network (LAN)/Wide Area Network (WAN) 104, Public Switched Telephone Network (PSTN) 109, cellular wireless network 112, and satellite communications network 116. As such, system 100 makes up a plurality of heterogeneous networks, and one or more of these networks can be used to implement the present invention.

IP network 102 can be a publicly available IP network, a private IP network, or a combination of public and private IP networks. In any case, IP network 102 operates according to the Internet Protocol and can route packets through its numerous switches and transmission paths. IP networks are generally known in the art to be expandable, fairly easy to use and heavily supported. Coupled to IP network 102 is Domain Name Server (DNS) 108 to which queries may be sent, with such queries each requesting an IP address based upon a Uniform Resource Locator (URL). IP network 102 can support 32 bit IP addresses as well as 128 bit IP addresses.

LAN/WAN 104 is coupled to IP network 102 via proxy server 106 (or any other appropriate connection). LAN/WAN 104 can operate according to various communication protocols, such as the Internet Protocol, the Asynchronous Transfer Mode (ATM) protocol, or other known packet switched protocols. Proxy server 106 functions primarily to route data between IP network 102 and LAN/WAN 104. A firewall that precludes unwanted communications from entering LAN/WAN 104 may also be located at the site of proxy server 106.

Computer 120 is coupled to LAN/WAN 104 and supports communications with LAN/WAN 104. Computer 120 can employ LAN/WAN 104 and proxy server 106 to communicate with other devices across IP network 102. Such communications are generally known in the art and will not be further described herein except to expand upon the teachings of the present invention. Also, phone 122 can be coupled to computer 120 and employed to initiate IP Telephony communications with another phone or voice terminal using the IP Telephony functions available. In such an IP telephony system, a service provider can deploy a gatekeeper (not shown) to manage IP telephony for its users. IP phone 154 connected to IP network 102 (or other phone, such as, for example, phone 124) can be used to communicate with phone 122 using IP telephony.

PSTN 109 is a circuit switched network that is employed primarily for voice communications, such as those enabled by standard phone 124. However, PSTN 109 can also support the transmission of data. Data transmissions may be supported to a tone-based terminal, such as facsimile (FAX) machine 125, a tone-based modem contained in computer 126, or another device that can be coupled to PSTN 109 via a digital connection, such as an Integrated Services Digital Network (ISDN) line, an Asynchronous Digital Subscriber Line (ADSL), or another appropriate digital connection to a terminal that supports such a connection. As illustrated, a voice terminal, such as phone 128, can be coupled to PSTN 109 via computer 126 rather than being supported directly by PSTN 109, as can be the case with phone 124. Thus, for example, computer 126 can support IP telephony with voice terminal 128.

Cellular network 112 supports wireless communications with terminals operating within its service area (e.g., providing coverage for a city, county, state, country, etc.). Cellular network 112 can include a plurality of base transmitter system (BTS) towers (e.g., tower 130), and each such tower can define and service radiotelephone or wireless communications within a respective cell. Wireless terminals operate in conjunction with cellular network 112 and can include wireless handsets 132 and wireless-enabled laptop or personal computers 134, for example. Wireless handsets 132 can be, for example, personal digital assistants (PDA's), radiotelephones, wireless or cellular telephones, or two-way pagers. Cellular network 112 can be coupled to IP network 102 via gateway 114.

Wireless handsets 132 and wireless-enabled laptop or personal computers 134 can communicate with cellular network 112 using, for example, a wireless application protocol (WAP). The WAP is an open, global specification that allows mobile users with wireless devices, such as, for example, mobile phones, pagers, two-way telephones phones, radiotelephones, smart-phones, communicators, PDA's, and portable laptop or similar personal computers, to easily and almost instantly access and interact with network provided information and services. The WAP is a communications protocol and application environment and can be built on any operating system (OS) including, for example, Palm OS, EPOC, Windows CE, FLEXOS, OS/9, and a Java OS. The WAP can also provide interoperability between different families of devices.

Furthermore, the WAP is a wireless equivalent of Hypertext Transfer Protocol (HTTP) and Hypertext Markup Language (HTML). The HTTP-like component of the WAP defines the communication protocol between the handheld device and a server or gateway. This component addresses characteristics that are unique to wireless devices, such as data rate and round-trip response time. The HTML-like component of the WAP, Wireless Markup Language (WML), defines markup and scripting languages for displaying information to, and interacting with, the users. The WML component of the WAP is highly focused on the limited display size and limited input devices available on small, handheld devices. For example, a typical cell phone may have a 4×10-character display with 16-gray levels, a numeric keypad, and up/down volume keys.

Cellular network 112 operates according to a particular mobile radiotelephone operating standard, which can be, for example, an Advanced Mobile Phone System (AMPS) standard, Digital-AMPS (D-AMPS) standard, Code Division Multiple Access (CDMA) standard, Time Division Multiple Access (TDMA) standard, Global System for Mobile Communications (GSM) standard, or any other appropriate mobile radiotelephone operating standard. As such, independent of the standards supported by cellular network 112, cellular network 112 can support voice and data communications with terminal units, such as, for example, terminals 132 and 134.

Exemplary satellite network 116 includes at least one satellite dish 136 that operates in conjunction with one or more satellites 138 to provide satellite communications with a plurality of terminals, such as, for example, laptop or personal computer 142 and satellite handset 140. Also, satellite handset 140 can be a two-way pager. Satellite network 116 can be serviced by one or more geo-synchronous orbiting communications satellites, a plurality of medium earth orbit (MEO) communications satellites, or a plurality of low earth orbit (LEO) communications satellites. In any case, satellite network 116 can provide voice and data communications and services and can be coupled to IP network 102 via gateway 118.

Wireless Proxy 160 can be coupled to IP network 102 and also to a plurality of transmission/reception towers (e.g., tower 162), each of which can provide wireless communications with wireless devices such as, for example, wireless device 164. Wireless Proxy 160 can provide access to IP network 102 for wireless device 164. For example, wireless device 164 can be a PDA or wireless telephone, which may require proprietary or other special protocols in order to communicate with IP network 102. For example, wireless proxy server 160 can be a 3Com server utilizing 3Com protocols for communicating with a Palm VII, which is a handheld, portable computing device available from 3Com Corporation in Santa Clara, Calif.

Also, wireless proxy 160 can be a 3Com proxy server supporting communications with, for example, a Palm VII personal organizer, and portable computing device 164 can be a Palm VII personal organizer. As such, communications between wireless proxy server 160 and portable computing device 164 can be facilitated by the use of Palm Query Applications (PQAs).

A PQA is similar to a mini-Web site that can reside on portable computing device 164. In other words, a PQA can be a special type of records database. A typical PQA can contain an HTML form, or a list of hyperlinks that request additional information either locally on personal computing device 164 or remotely via the Internet. As such, PQAs are available that can access targeted bits of Internet information, similar to clippings from a newspaper. Typically, a handheld computer user does not focus on following hyperlinks to the Internet (although this is available), but instead, a typical user composes a simple query in a PQA (for example a request for a stock quote), and then sends that query over the airwaves.

In any event, the configurations and operations of the networks shown in FIG. 1 are described herein for illustrative and explanatory purposes only, and are intended as examples and not as architectural limitations for the processes of the present invention.

Figure 2:
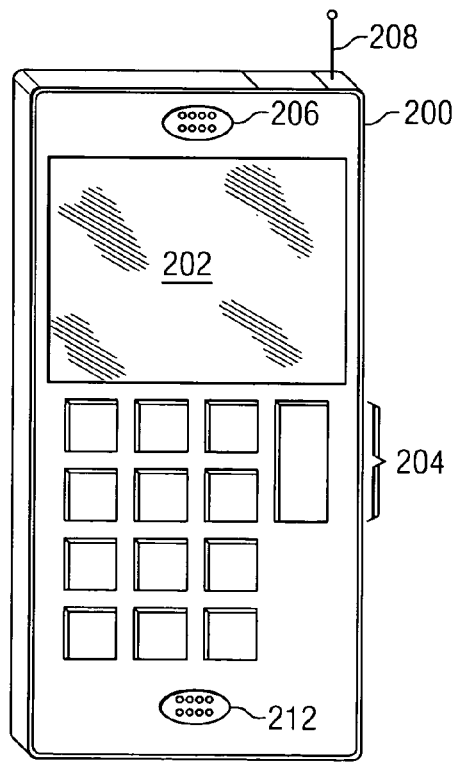
FIG. 2 is a pictorial diagram of a wireless telephone that can be used for implementing a preferred embodiment of the present invention.

With reference now to FIG. 2, a pictorial diagram of a wireless telephone is depicted that can be used for implementing a preferred embodiment of the present invention. Wireless telephone 200 can include display 202 for presenting at least textual and graphical information. Display 202 can be a known display device, such as a liquid crystal display (LCD), plasma display, or any other display device that can be used appropriately with such a wireless telephone. For this exemplary embodiment, display 202 can be used to present and manipulate, among other things, a call tree or similar menu of options provided, for example, from an automated telephone answering system. Also, for this embodiment, wireless telephone 200 can include appropriate software to execute a Web browser and perform such processing functions as downloading and uploading data from and to the Internet, and similar other processing functions. As such, wireless telephone 200 can also perform the two-way communication functions of a typical wireless telephone.

Wireless telephone 200 may also include keypad 204, speaker 206, antenna 208, and microphone 212. Keypad 204 may be used to receive typed or cursor-like input from a user. Speaker 206 provides a mechanism for audio output, such as the voice audio of a party to whom the user of wireless telephone 200 may be speaking. Microphone 212 provides a mechanism for audio input such as for speaking to a called party. Antenna 208 provides a mechanism for establishing a wireless communications link between wireless phone 200 and a network, such as, for example, network 102 in FIG. 1.

Figure 3:
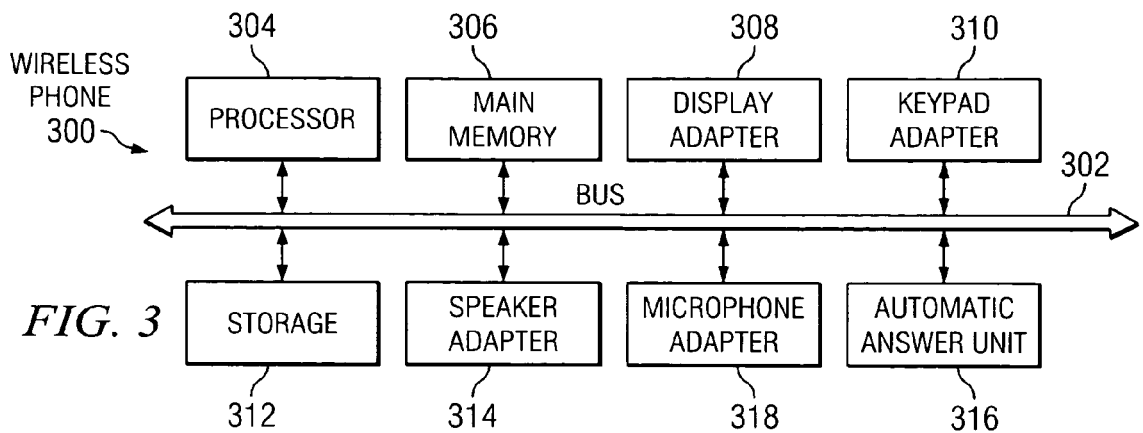
FIG. 3 is a block diagram of a wireless telephone, such as any of the wireless telephones illustrated in FIG. 2.

Turning now to FIG. 3, a block diagram of a wireless telephone is depicted in accordance with a preferred embodiment of the present invention. Wireless telephone 300 is an example of a wireless telephone, such as wireless telephone 200 in FIG. 2, in which code or instructions implementing the processes of the present invention may be stored and executed. Exemplary wireless telephone 300 includes bus 302 to which processor 304 and main memory 306 are connected. Display adapter 308, keypad adapter 310, storage 312, microphone adapter 318, audio adapter 314, and automatic answer unit 316 also are connected to bus 302.

For this exemplary embodiment, an OS runs on processor 304 and can be used to coordinate and provide control of various components within wireless telephone 300 in FIG. 3. Instructions for the OS and applications or programs can be located on storage devices, such as storage device 312, and can be loaded into main memory 306 for execution by processor 304. Those of ordinary skill in the art will appreciate that the hardware in FIG. 3 can vary depending on the implementation. Other internal hardware or peripheral devices, such as flash ROM (or equivalent nonvolatile memory) or optical disk drives and the like, may be used in addition to or in place of the hardware depicted in FIG. 3.

Figure 4A:
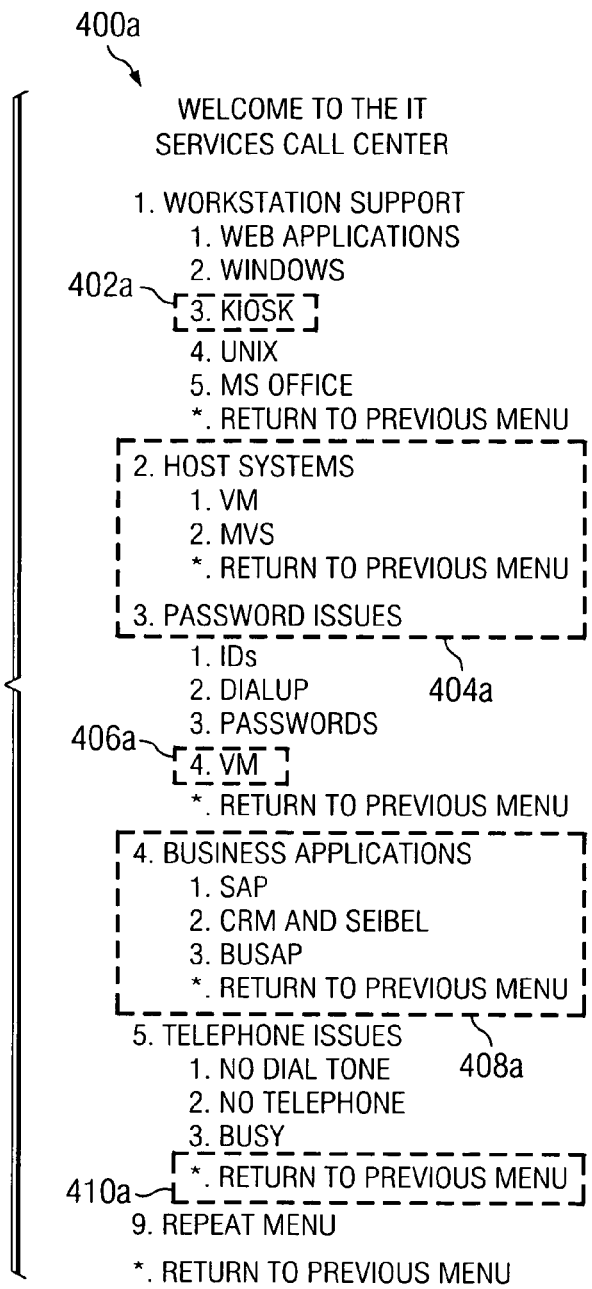
FIGS. 4A and 4B are related exemplary screens of display that illustrate principles of the present invention.
Figure 4B:
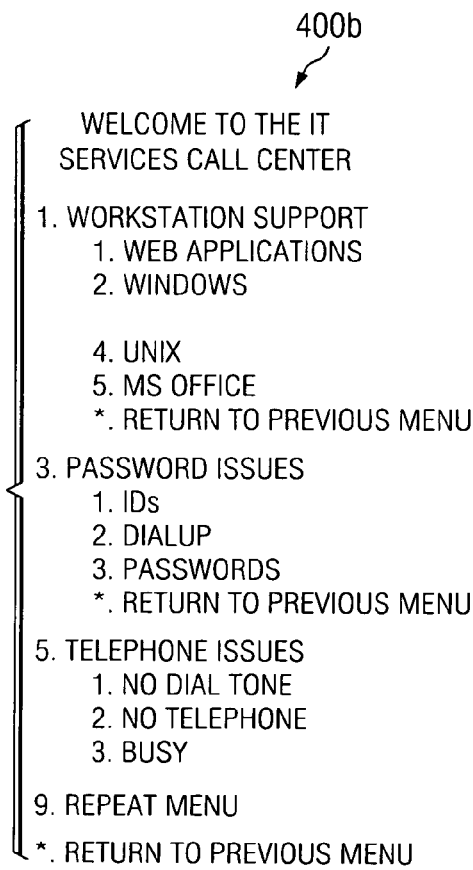

With reference now to FIGS. 4A and 4B, related exemplary screens of display are depicted that illustrate principles of the present invention. For example, in accordance with a preferred embodiment of the present invention, the exemplary information shown in FIGS. 4A and 4B can represent illustrative screens of display of call trees or menu options for an automated telephone answering system. Also, for example, the exemplary information shown in FIGS. 4A and 4B can represent illustrative screens of display on a wireless telephone (e.g., wireless telephone 132, 140, 164), and/or a monitor for a computer (e.g., 120, 126, 134, 142). For this exemplary embodiment, it may be assumed (for illustrative purposes only) that the exemplary information of FIGS. 4A and 4B are related screens of display for the display of wireless (e.g., cellular) telephone 132. In this regard, in accordance with a preferred embodiment of the present invention, exemplary screen of display 402b in FIG. 4B represents a rearranged version of the call tree shown as screen of display 402a in FIG. 4A.

Figure 5:
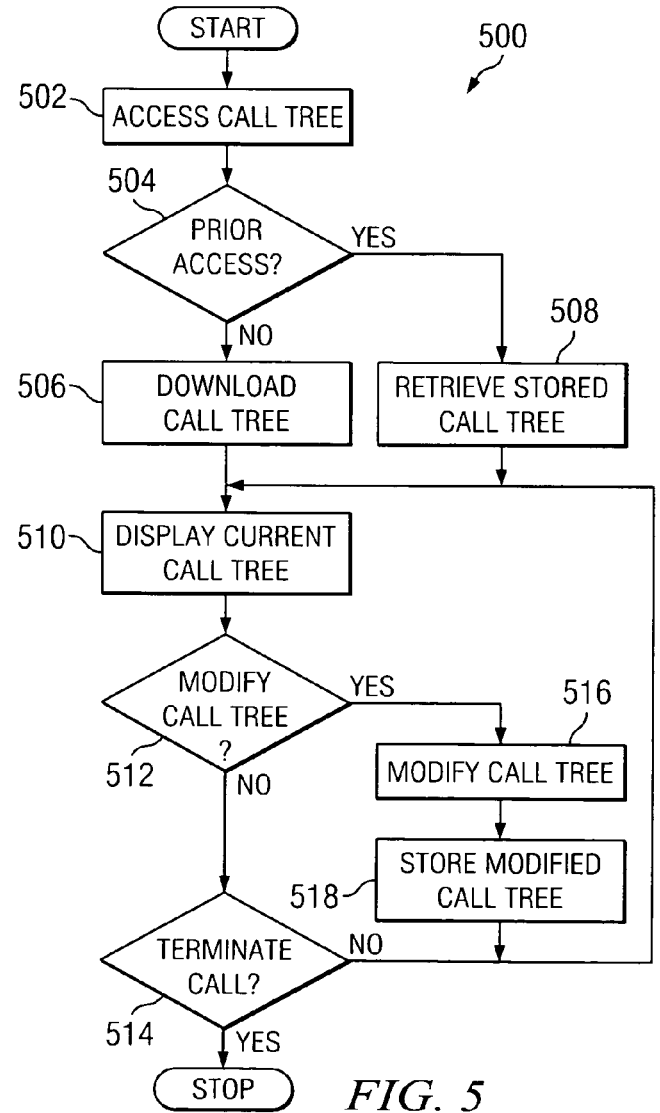
FIG. 5 is a flowchart of a process for visually rearranging telephone call trees in accordance with a preferred embodiment of the present invention.

With reference now to FIG. 5, a flowchart of a process for visually rearranging telephone call trees is depicted in accordance with a preferred embodiment of the present invention. As such, for this example, the process illustrated in FIG. 5 may be implemented in wireless telephone 132.

Exemplary process 500 begins by a user accessing a call tree of interest (step 502). For example, the user can place a telephone call (e.g., with wireless telephone 132) to a number associated with a particular service provider (e.g., Information Technology services call center), and an automated telephone answering system can answer that call. Also, for example, the number called can be for a telephone associated with that service provider (e.g., wire-line telephone 128), and the number and telephone also can be associated with a computer (e.g., 126) where such an automated telephone answering system can reside. Once an appropriate telephone connection is made between these telephones or telephone systems, an application running in wireless telephone 132 (or the user) can determine whether or not this particular telephone number and/or service provider has been called earlier (step 504). If not, wireless telephone 132 can display text describing this fact for the user. In response, the user (e.g., or software application running in wireless telephone 132) can initiate a download (e.g., with an internal browser) of the service provider's call tree (step 506). As an alternative, the service provider's call tree can be input (e.g., manually keyed) directly into wireless telephone 132. Also, as another alternative, a speech recognition application running in wireless telephone 132 can be used for vocally inputting the call tree into wireless telephone 132.

Next, the application running in wireless telephone 132 can display on display 202 the downloaded call tree (step 510). An illustrative example of such a downloaded call tree is call tree (or menu) 400a shown in FIG. 4A. If desired, the user can view all or parts of downloaded call tree 400a on display 202. Alternatively, for example, the user can view all or parts of downloaded call tree 400a on a monitor associated with computer 134, if that particular approach is preferred. In any event, for this example, it may be assumed that a user can still interact with and utilize call tree 400a via keyed or typical inputs to wireless telephone 132 and/or computer 134.

Next, the user can decide whether or not to modify displayed call tree 400a (step 512). If not, at some pertinent point in time, the user can decide whether or not to terminate the call (step 514). If the user decides not to terminate the call, then the flow can return to step 510. Otherwise, the call can be terminated if so desired.

If, for this example, the user decides to modify call tree 400a at step 512, the user can input instructions for the application running in wireless telephone 132 (or computer 143 if preferred) to modify selected parts of call tree 400a (step 516). For example, the user can perform a "click and drag" function with a cursor shown on display 202, and manipulate and move the one or more highlighted parts of call tree 400a on display 202.

As such, call tree 400a can be rearranged so that option "#3" (e.g., option activated by depressing the "3" button on wireless telephone 132) is actually at the top of the menu, because (for this example) that is the function the user anticipates using the most. As another example, call tree 400a can be rearranged so as to place the menu items not to be used at the bottom of the call tree. As still another example, the user may perform a "click and drag" or similar function and delete the highlighted part or parts of call tree 400a. Preferably, the "deleted" parts of call tree 400a can be stored for later use, if so desired. In any event, it should be understood that call tree 400a can have numerous sub-levels that are not actually depicted in FIG. 4A or 4B, and call tree 400a shown is not intended as an architectural limitation for the present invention. Furthermore, call tree 400a can include additional information that can be used to expand in response to expand in response to user input (e.g., a user depressing a "+" shown in the call tree. For example, a "+" next to the words "IT Services" can be depressed by a user to derive a definition of this term. The service provider can provide such additional information, or the user can input text to annotate parts of the call tree and explain a particular selection or term. As such, in accordance with principles of the present invention, the user can manipulate parts or nodes of call tree 400a and thus make call tree 400a more user friendly. Example of such user actions are illustrated in FIGS. 4A and 4B.

Referring to FIG. 4A, it may be assumed that a user has viewed call tree 400a on display 202 (e.g., step 510). Also, it may be assumed that the user prefers not to use all of the options shown in call tree 400a and has performed a "click and drag" or similar function to delete parts of call tree 400a (e.g., 402a, 404a, 406a, 408a, 410a). As a result, for this example, these deleted parts are removed from modified call tree 400b of FIG. 4B. Note that modified call tree 400b is missing the exemplary deleted parts of call tree 400a (e.g., 402a, 404a, 406a, 408a, 410a), which makes call tree 400b more user friendly for the user than call tree 400a.

Next, for this exemplary embodiment, the user inputs instructions to wireless telephone 132 to store modified call tree 400b (step 518). Also, for example, the user can store the unmodified call tree (e.g., call tree 400a) if desired. The modified (and unmodified) call tree(s) can be stored in storage 312 in FIG. 3 (e.g., in storage 312 in FIG. 3). However, as another option, modified call tree 400b and unmodified call tree 400a can be stored at the service provider's storage location (e.g., computer 126).

Returning to step 504, if the application running in wireless telephone 132 (or the user) determines that this particular telephone number and/or service provider has been called earlier, then the application (or the user) can initiate an action for wireless telephone 132 (or computer 134) to retrieve a stored call tree, such as, for example, modified call tree 400b (step 508). For example, the stored call tree can be retrieved from storage 312 in FIG. 3. The flow can then proceed to step 510.

It is important to note that while the present invention has been described in the context of a fully functioning data processing system or system of communication networks, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for navigating a telephone call tree, comprising:
   a data storage area operable to provide a telephone call tree associated with an automated telephone answering system of a called provider; and
   a communication unit of a caller of said called provider, said communication unit coupled to said data storage area and operable to:
   display said telephone call tree at said communication unit;
   arrange at least one part of said displayed telephone call tree to produce a modified telephone call tree; and
   store at least one of said modified telephone call tree and said telephone call tree.

2. The system of claim 1, wherein the provide operation comprises an operation for said communication unit to:
   access a hyper-link, said hyper-link including a network address associated with said telephone call tree; and
   download said telephone call tree at said communication unit.

3. The system of claim 1, wherein said communication unit is further operable to:
   retrieve said stored at least one of said modified telephone call tree and said telephone call tree; and
   display said retrieved said at least one of said modified telephone call tree and said telephone call tree at the communication unit.

4. The system of claim 1, wherein said arrange operation comprises an operation to edit said at least one part of said displayed telephone call tree.

5. The system of claim 1, wherein said arrange operation comprises an operation to delete said at least one part of said displayed telephone call tree.

6. The system of claim 1, wherein said arrange operation comprises a drag and drop operation.

7. A communication unit for navigating a telephone call tree, comprising:
   a display device;
   a storage area; and
   a processor, said processor coupled to said storage area and said display device, and operable to:
   provide a telephone call tree associated with an automated telephone answering system of a provider called by the communication unit;
   display said telephone call tree by the display device;
   arrange at least one part of said displayed telephone call tree to produce a modified telephone call tree; and
   store at least one of said modified telephone call tree and said telephone call tree at the storage area.

* * * * *